US009564163B2

(12) United States Patent
Contreras et al.

(10) Patent No.: US 9,564,163 B2
(45) Date of Patent: Feb. 7, 2017

(54) IMPLEMENTING DUAL PARTIALLY INDEPENDENT THERMAL FLYHEIGHT CONTROL (TFC) FOR HARD DISK DRIVES

(71) Applicant: HGST Netherlands B.V., Amsterdam (NL)

(72) Inventors: John Contreras, Palo Alto, CA (US); Ian Robson McFadyen, San Jose, CA (US); Erhard Schreck, San Jose, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/678,906

(22) Filed: Apr. 3, 2015

(65) Prior Publication Data

US 2016/0293194 A1    Oct. 6, 2016

(51) Int. Cl.
G11B 5/60    (2006.01)

(52) U.S. Cl.
CPC ..................... *G11B 5/607* (2013.01)

(58) Field of Classification Search
CPC ........................................ G11B 5/60–5/6011
USPC ....................................................... 360/55, 75
See application file for complete search history.

(56) References Cited

U.S. PATENT DOCUMENTS

| 7,068,468 | B2* | 6/2006 | Kamijima ..................... 360/128 |
| 7,133,254 | B2* | 11/2006 | Hamann et al. ................ 360/75 |
| 7,190,543 | B2* | 3/2007 | Suk ................................. 360/69 |
| 7,400,473 | B1 | 7/2008 | Krajnovich et al. |
| 7,486,465 | B2* | 2/2009 | Kondo ............................ 360/75 |
| 7,525,765 | B2 | 4/2009 | Kurita et al. |
| 7,688,537 | B2* | 3/2010 | Kiyono et al. ................... 360/75 |
| 7,808,746 | B2* | 10/2010 | Burbank et al. ........... 360/294.3 |
| 8,159,780 | B2* | 4/2012 | Brand ....................... 360/125.02 |
| 8,208,221 | B2* | 6/2012 | Burbank et al. ......... 360/125.74 |
| 8,432,636 | B2* | 4/2013 | Brand ....................... 360/125.02 |
| 8,634,167 | B2 | 1/2014 | Hsiao et al. |
| 8,724,263 | B2* | 5/2014 | Hutchinson et al. .... 360/125.74 |
| 8,810,952 | B2* | 8/2014 | Johnson et al. ................ 360/75 |
| 9,058,829 | B1* | 6/2015 | Wolf et al. |

(Continued)

OTHER PUBLICATIONS

"The effect of write current on thermal flying height control sliders with dual heater/insulator elements" by Zheng et al. http://download.springer.com/static/pdf/575/art%253A10.1007%252Fs00542-010-1216-4.pdf?auth66=1402472277_228285e4d7149f21ed8b781b6a997310&ext=.pdf Jan. 19, 2011.

*Primary Examiner* — Wayne Young
*Assistant Examiner* — James L Habermehl
(74) *Attorney, Agent, or Firm* — Joan Pennington (57) ABSTRACT

A method, apparatus, and system are provided for implementing dual partially independent flyheight control (TFC) for hard disk drives (HDDs). A dual thermal flyheight control (TFC) includes a series connected first heater resistor and a second heater resistor connected between a pair of wires. A capacitor is connected in parallel with the first heater resistor providing a frequency dependent shunt to the parallel connected first heater resistor. TFC electrical bias signals are applied to the first heater resistor and second heater resistor carried by the pair of wires. For example, the TFC electrical bias signals include high frequency electrical signals including a frequency range between 1 MHz and 100 MHz having a set amplitude in a voltage range between 0 and 7 Volts, and/or DC current signal.

20 Claims, 7 Drawing Sheets

(56) References Cited

U.S. PATENT DOCUMENTS

| | | | |
|---|---|---|---|
| 2009/0213483 A1* | 8/2009 | Matsui | G11B 5/3136 360/59 |
| 2011/0149430 A1 | 6/2011 | Shiramatsu et al. | |
| 2012/0099218 A1 | 4/2012 | Kurita et al. | |
| 2014/0009851 A1 | 1/2014 | Budde | |
| 2015/0162022 A1* | 6/2015 | Peng et al. | 360/75 |

* cited by examiner

IMPLEMENTING DUAL PARTIALLY INDEPENDENT THERMAL FLYHEIGHT CONTROL (TFC) FOR HARD DISK DRIVES

FIELD OF THE INVENTION

The present invention relates generally to the data storage field, and more particularly, relates to a method, apparatus, and system for implementing dual partially independent flyheight control (TFC) for hard disk drives (HDDs).

DESCRIPTION OF THE RELATED ART

Many data processing applications require long-term data storage and typically a high-degree of data integrity. Typically these needs are met by non-volatile data storage devices. Non-volatile storage or persistent media can be provided by a variety of devices, most commonly, by direct access storage devices (DASDs), which also are referred to as hard disk drives (HDDs).

Dual thermal flyheight control (TFC) with one heater near the write head and another heater near the read head that are actuated independently could offer advantages where the dual TFC heaters enable adjustments for topography and tuning slider disk spacing, and have flexibility in adjusting a power gamma value.

A problem with providing such dual TFC heaters is that a straight forward implementation would require an addition connection pad to the head and interconnect. It is desirable to provide a dual TFC heater arrangement that does not require an increase in the number of needed connections.

SUMMARY OF THE INVENTION

Aspects of the preferred embodiments are to provide a method, apparatus, and system for implementing dual partially independent flyheight control (TFC) for hard disk drives (HDDs). Other important aspects of the preferred embodiments are to provide such method, apparatus, and system substantially without negative effect and to overcome some of the disadvantages of prior art arrangements.

In brief, a method, apparatus, and system are provided for implementing dual partially independent flyheight control (TFC) for hard disk drives (HDDs). A dual thermal flyheight control (TFC) includes a series connected first heater resistor and a second heater resistor connected between a pair of wires carrying TFC signals. A capacitor is connected in parallel with the first heater resistor providing a frequency dependent shunt to the parallel connected first heater resistor. TFC electrical drive signals are applied to the first heater resistor and second heater resistor carried by the pair of wires.

For example, variable AC high frequency signals or fixed AC high frequency signals are applied with a variable amplitude of high frequency electrical signals. For example, a frequency change can be used for fine adjustment and AC amplitude change for coarse adjustment.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

In the following detailed description of embodiments of the invention, reference is made to the accompanying drawings, which illustrate example embodiments by which the invention may be practiced. It is to be understood that other embodiments may be utilized and structural changes may be made without departing from the scope of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In accordance with features of the preferred embodiments, a method, apparatus, and system are provided for implementing dual partially independent flyheight control (TFC) for hard disk drives (HDDs). The dual thermal flying height control (TFC) includes two TFC heater resistors, one near the write head, and one near the read head. Controlling the minimum flypoint accurately for reading and writing under all drive operating conditions offers a significant advantage to achieve higher areal density and better reliability.

In accordance with features of the preferred embodiments, the method, apparatus, and system for implementing dual partially independent flyheight control (TFC) for hard disk drives (HDDs) enables a ratio of power dissipation in the TFC heater resistors to be varied by changing the AC to DC power ratio and/or by changing the AC frequency of the drive signal.

Figure 1:
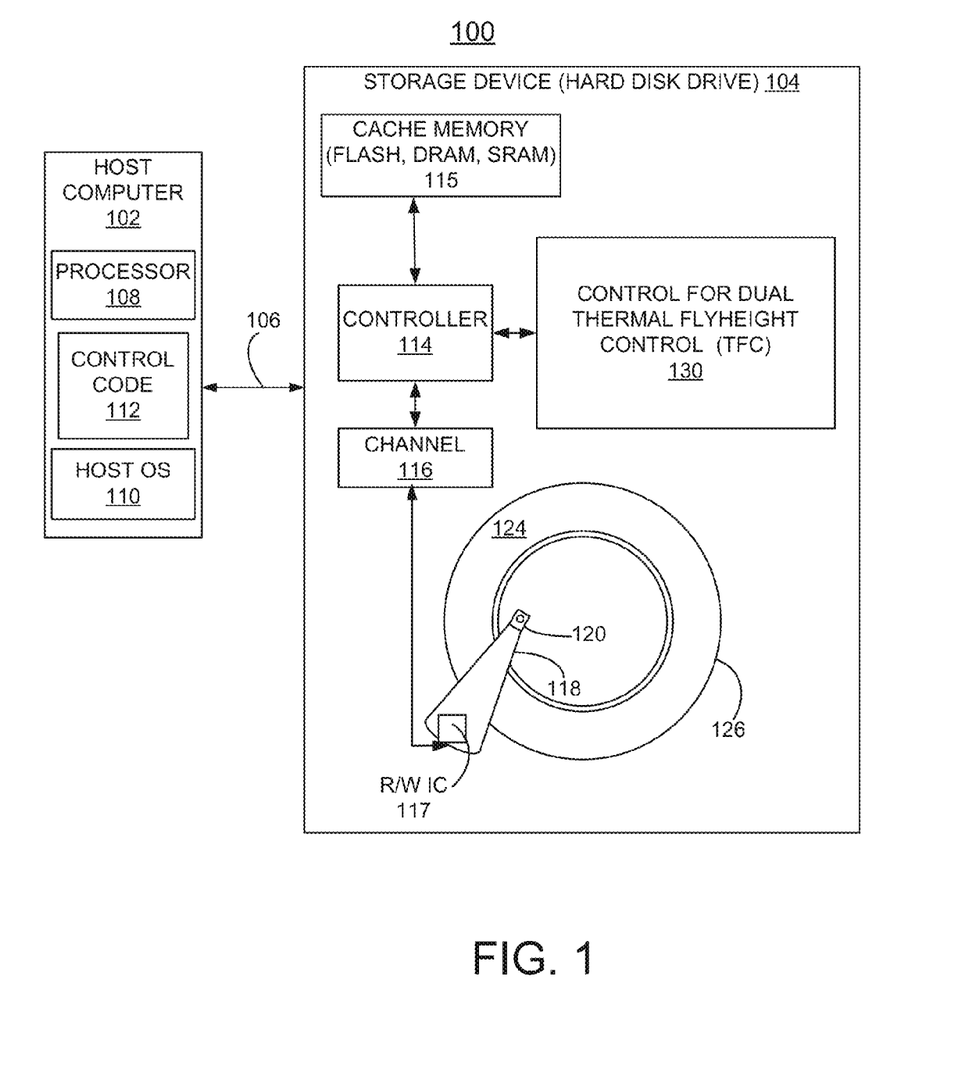
FIG. 1 is a block diagram representation illustrating a system for implementing dual partially independent flyheight control (TFC) for hard disk drives (HDDs) in accordance with preferred embodiments.

Having reference now to the drawings, in FIG. 1, there is shown an example system generally designated by the reference character 100 for implementing dual partially independent flyheight control (TFC) for hard disk drives (HDDs) in accordance with preferred embodiments. System 100 includes a host computer 102, a storage device 104, such as a hard disk drive (HDD) 104, and an interface 106 between the host computer 102 and the storage device 104.

As shown in FIG. 1, host computer 102 includes a processor 108, a host operating system 110, and control code 112. The storage device or hard disk drive (HDD) 104 includes a controller 114 coupled to a cache memory 115, for example, implemented with one or a combination of a flash memory, a dynamic random access memory (DRAM) and a static random access memory (SRAM), and coupled to a data channel 116. The storage device or hard disk drive 104 includes a Read/Write (R/W) integrated circuit (IC) 117 with programmable drive signals for dual partially independent flyheight control (TFC) of the preferred embodiments. The storage device or hard disk drive 104 includes an arm 118 carrying a slider 120 in accordance with preferred embodiments. The slider 120 flies over a writable disk surface 124 of a disk 126 including a read/write head integrated with the slider 120.

In accordance with features of preferred embodiments, a control for dual flyheight control (TFC) 130 is provided with the controller 114, for example, for implementing dual partially independent flyheight control (TFC) for hard disk drives (HDDs).

System 100 including the host computer 102 and the HDD 104 is shown in simplified form sufficient for understanding the present embodiments. The illustrated host computer 102 together with the storage device or HDD 104 is not intended to imply architectural or functional limitations. The present invention can be used with various hardware implementations and systems and various other internal hardware devices.

Figure 2:
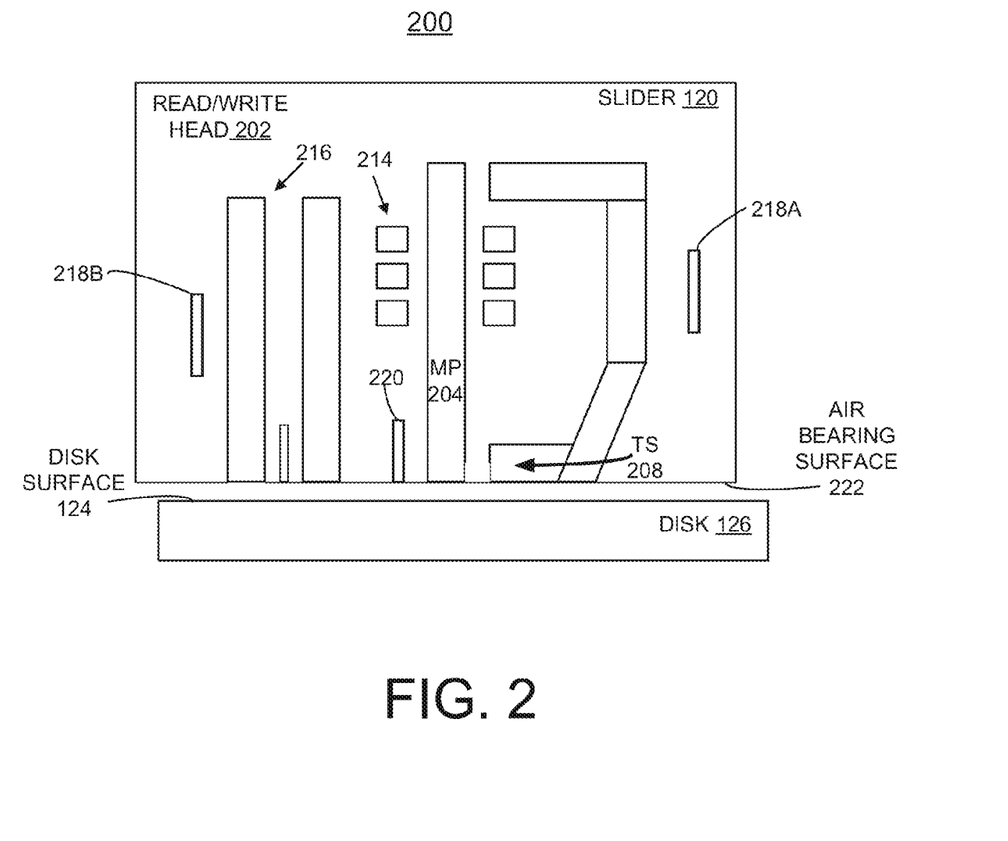
FIG. 2 schematically illustrates example apparatus for implementing dual partially independent flyheight control (TFC) for hard disk drives (HDDs) in accordance with preferred embodiments.

Referring now to FIG. 2, there is shown example apparatus generally designated by the reference character 200 for implementing dual partially independent flyheight control (TFC) for hard disk drives (HDDs) of the preferred embodiments.

As shown in FIG. 2, apparatus 200 includes a recording head 202, such as a read/write head 202 provided with the slider 120. The recording head 202 includes a main magnetic pole (MP) 204, and a trailing shield 208 of a head writer. As shown, the head 202 includes a coil 214 positioned proximate the main magnetic pole MP 204, a reader 216, and a dual thermal flying height control (TFC) 218A and 218B, one near the write head, and one near the read head or reader in accordance with preferred embodiments. The recording head 202 includes the air bearing surface 222 of the recording head 202 that is disposed proximate to the disk surface 124 of disk 126.

Figure 3:
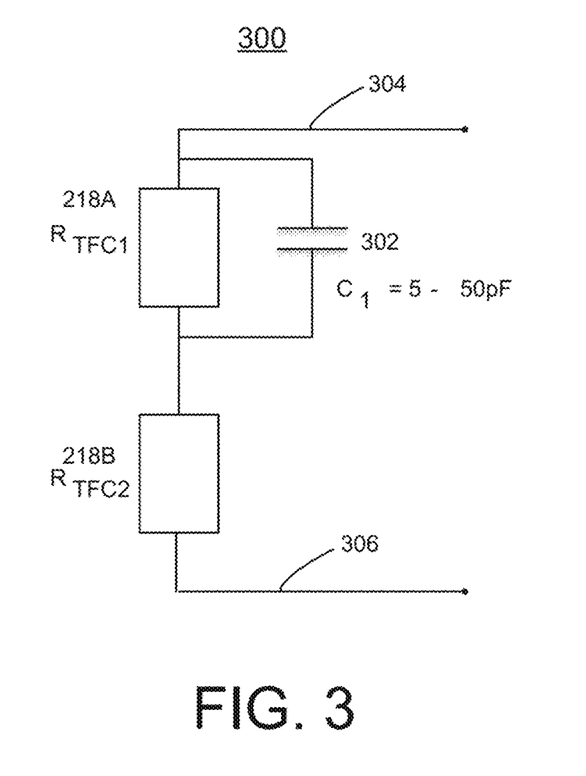
FIG. 3 schematically illustrates example apparatus for implementing dual partially independent flyheight control (TFC) for hard disk drives (HDDs) in accordance with preferred embodiments.

Referring now to FIG. 3, there is shown example apparatus generally designated by the reference character 300 for implementing dual partially independent flyheight control (TFC) for hard disk drives (HDDs) in accordance with preferred embodiments. Apparatus 300 provides dual partially independent thermal flyheight control (TFC) and includes a series connected first heater resistor $R_{TFC1}$, 218A and a second heater resistor $R_{TFC2}$, 218B connected between a pair of wires 304, 306 carrying TFC signals. A capacitor 302 is connected in parallel with the first heater resistor $R_{TFC1}$, 218A providing a frequency dependent shunt to the parallel connected first heater resistor. High frequency electrical signals, such as in the range of 1 MHz to 100 MHz, partially bypass the first heater resistor $R_{TFC1}$, 218A to pass through the second heater resistor $R_{TFC2}$, 218B with the pair of wires carries a DC current that passes through both the first heater resistor $R_{TFC1}$, 218A and the second heater resistor $R_{TFC2}$, 218B.

The dual partially independent flyheight control (TFC) apparatus 300 always affects both TFC powers and thus is called partially independent. For example, only a small correction to the power distribution is needed in order to get to a gamma of 1, where gamma represents a ratio of motion between reader and writer, such as represented by Gamma=reader motion/writer motion In accordance with features of the preferred embodiments, the dual partially independent flyheight control (TFC) apparatus 300 is easily implemented. The dual partially independent flyheight control (TFC) apparatus 300 can be driven with an AC bias or a combination of AC bias and DC bias. The electrical bias can be a voltage, current or power. For the power bias, AC or DC bias is implemented by sensing the DC and AC resistance changes and applying a constant power to mitigate any resistance changes from the environment or self-heating effects. For this description, voltage bias will be used, which does not limit these same principles applied to current or power bias. The capacitor 302 is integrated in slider 120 and has a typical value between 5 to 50 picoFarads. Controller 114 provides a TFC drive with R/W IC 117 applying an AC or AC+DC voltage bias combined DC current and ACvoltage high frequency electrical signals, such as in the range of 1 MHz to 100 MHz, which is easily supported by the electrical interconnect and interconnect R/W IC 117.

In accordance with features of the preferred embodiments, controller 114 provides a TFC electrical bias programmed signals through the Channel 116 and to the R/W IC 117. TFC electrical bias signals are applied to the first heater resistor $R_{TFC1}$, 218A, and second heater resistor $R_{TFC2}$, 218B carried by the pair of wires 304, 306. For example, a DC and AC TFC electrical voltage bias signal have an added voltage range that is within the power supply voltage of the R/W IC 117. Typically, only the positive supply is utilized, which is 5V. Accounting for the voltage tolerance and driving circuitry compliance voltage limits the DC and AC total voltage range is from 0 to 4V. For example, a DC voltage bias of 2.5V then limits the AC voltage bias to 1.5V peak. Using typical values for $R_{TFC1}$, 218A, and capacitance, 318, sets the high frequency electrical bias signals in a frequency range, which is typically between 1 MHz and 100 MHz. The AC power to can be done by a variable AC frequency signal or AC high frequency with avariable amplitude. A combination of controlling the frequency and the amplitude can be applied. Simultaneously, a DC bias can be applied.

Figure 4:
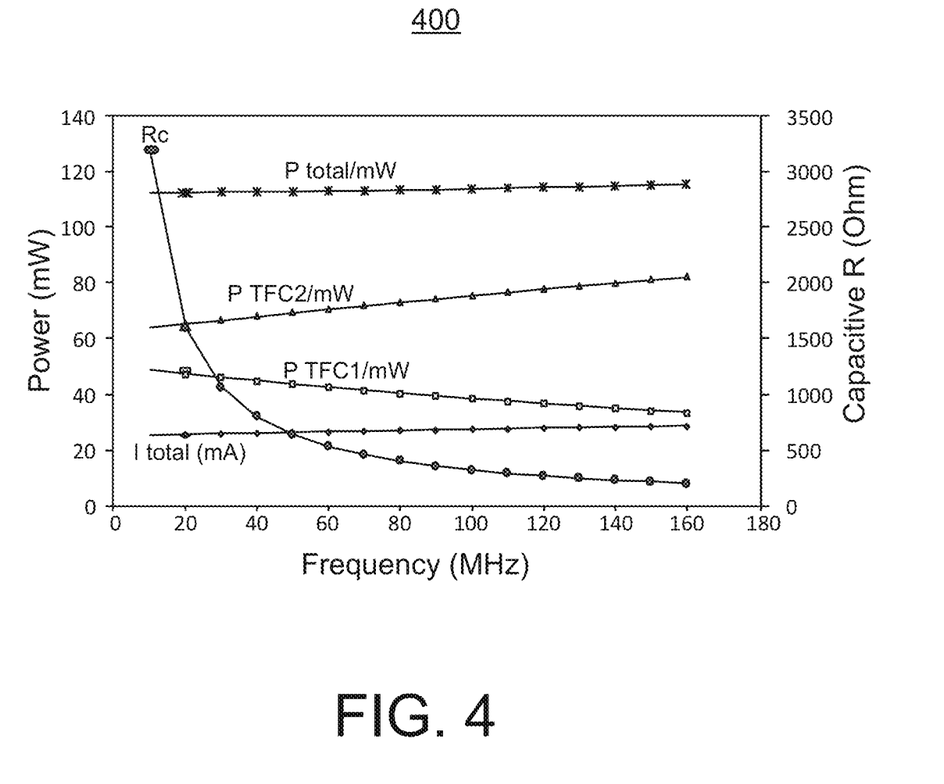
FIGS. 4 and 5 are example graphs illustrating dual partially independent flyheight control (TFC) power results as a function of frequency as applied in a hard disk drive (HDD) in accordance with preferred embodiments.
Figure 5:
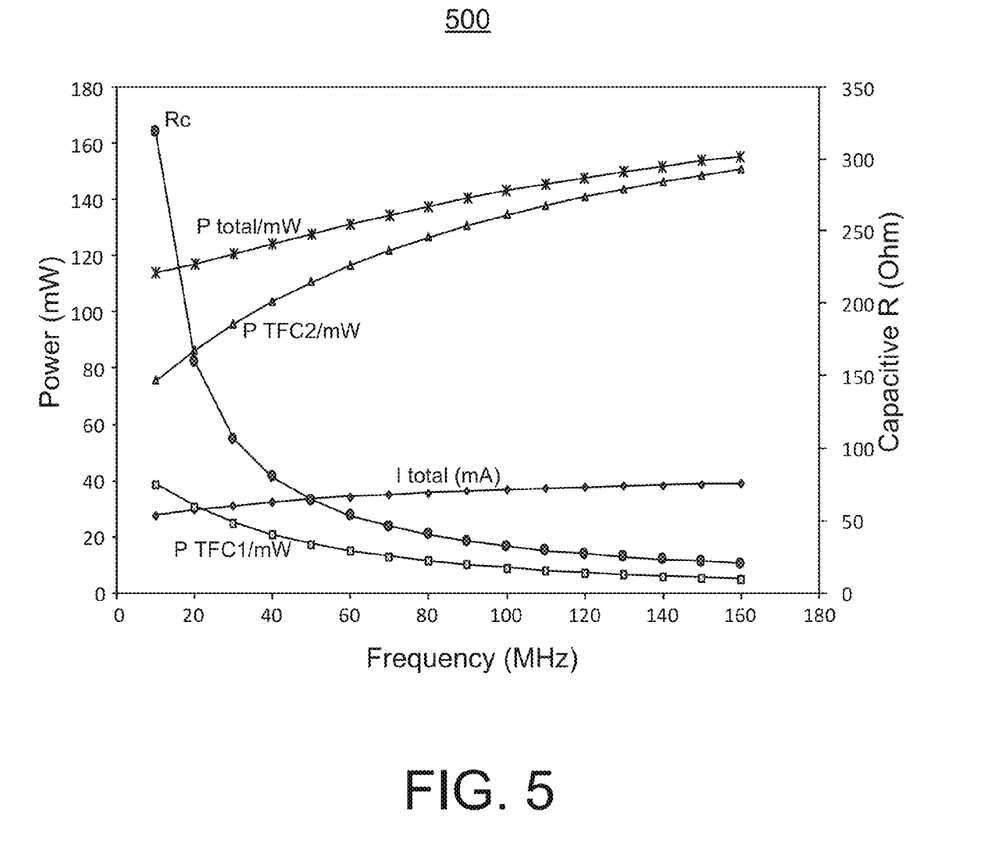

Referring now to FIGS. 4 and 5, there are shown example charts generally designated by the reference characters 400, 500 illustrating dual partially independent flyheight control (TFC) for hard disk drives (HDDs) in accordance with preferred embodiments showing the partially independently power control of the dual TFC . With a 5 pF capacitor 302 as illustrated with graphs 400 in FIG. 4, the power ratio between the two TFCs can be varied with a very large range, with the two TFCs including the first heater resistor $R_{TFC1}$, 218A and the second heater resistor $R_{TFC2}$, 218B of FIGS. 2 and 3. A 50 pF capacitor 302 is illustrated with waveforms 500 in FIG. 5.

Figure 6:
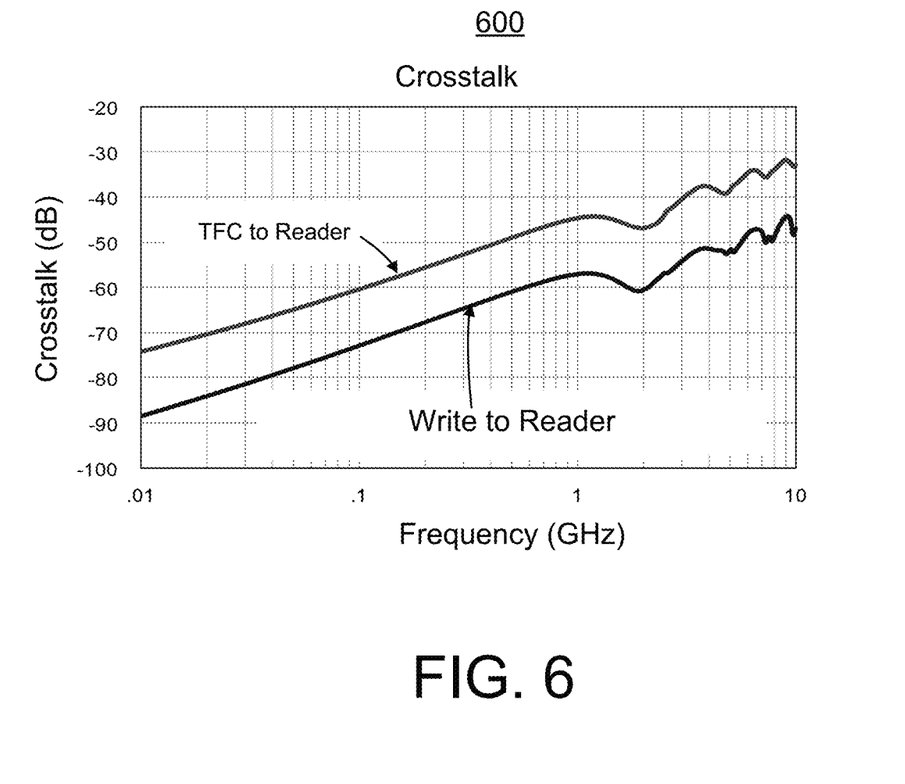
FIG. 6 are example chart with crosstalk in dB shown with respect to the vertical axis with TFC AC signal frequency in GHz shown with respect to the horizontal axis illustrating simulation of high-bandwidth TFC AC crosstalk to the Read in the suspension transmission path resulting in less than 50 dB in accordance with preferred embodiments.

Referring now to FIG. 6, there are shown graphs generally designated by the reference character 600 with crosstalk in dB shown with respect to the vertical axis with TFC AC signal frequency in GHz shown with respect to the horizontal axis illustrating simulation of high-bandwidth suspension transmission path to maintain less than 50 dB crosstalk in accordance with preferred embodiments.

Figure 7:
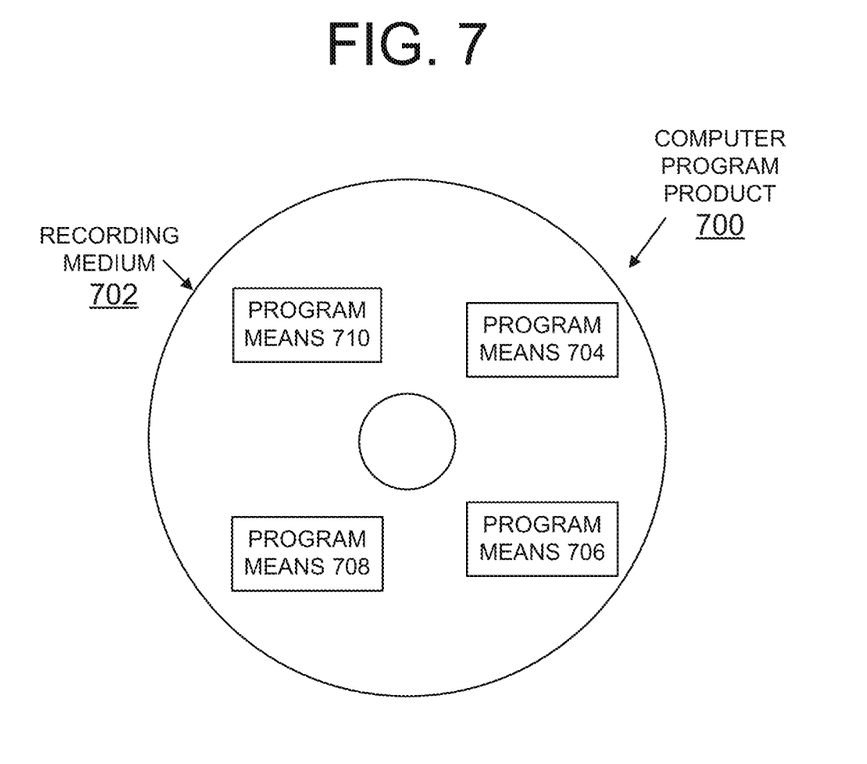
FIG. 7 is a block diagram illustrating a computer program product in accordance with preferred embodiments.

Referring now to FIG. 7, an article of manufacture or a computer program product 700 of the preferred embodiments is illustrated. The computer program product 700 includes a computer readable recording medium 702, such as, a floppy disk, a high capacity read only memory in the form of an optically read compact disk or CD-ROM, a tape, or another similar computer program product. Computer readable recording medium 702 stores program means or control code 704, 706, 708, 710 on the medium 702 for carrying out the methods for implementing dual partially independent flyheight control (TFC) for hard disk drives (HDDs) in accordance with preferred embodiments in the system 100 of FIG. 1.

A sequence of program instructions or a logical assembly of one or more interrelated modules defined by the recorded program means or control code 704, 706, 708, 710, direct HDD controller 114 for implementing dual partially independent flyheight control (TFC) of preferred embodiments.

While the present invention has been described with reference to the details of the embodiments of the invention shown in the drawing, these details are not intended to limit the scope of the invention as claimed in the appended claims.

What is claimed is:

1. A method for implementing dual partially independent flyheight control (TFC) for hard disk drives (HDDs), said method comprising:
   providing dual thermal flyheight control (TFC) includes a series connected first heater resistor and a second heater resistor; one of said first heater resistor and said second heater resistor provided near a write head and another of said first heater resistor and said second heater resistor provided near a read head;
   connecting the series connected first heater resistor and second heater resistor between a pair of wires;
   providing a capacitor connected in parallel with the first heater resistor to provide a frequency dependent shunt to the first heater resistor for high frequency electrical signals applied to said pair of wires; the second heater resistor only connected between the first heater resistor and one of said pair of wires; and
   applying TFC electrical bias signals to the first heater resistor and the second heater resistor carried by said pair of wires for providing partially independent power control and controlling minimum flypoint of said read head for reading and for controlling minimum flypoint of said write head for writing; and said applied TFC electrical bias signals including an AC bias frequency for maintaining suspension transmission path crosstalk of less than 50 dB; and said applied TFC electrical bias signals having a selected frequency change of said AC bias frequency for fine TFC adjustment and an AC amplitude change said AC bias frequency for coarse TFC adjustment.

2. The method as recited in claim 1, includes providing the capacitor having a selected capacitance value dependent on an available AC bias frequency affecting power of the first and second heater resistors.

3. The method as recited in claim 1, wherein said applying TFC electrical bias signals to the first heater resistor and the second heater resistor include applying an AC bias at a frequency range to effect power of the first and second heater resistors; and an amplitude of said AC frequency electrical signals includes a voltage range between available power supply voltages for the bias circuitry.

4. The method as recited in claim 1, wherein said applying TFC electrical bias signals includes said controller applying a DC and high frequency electrical signal to the first heater resistor and the second heater resistor.

5. The method as recited in claim 1, includes providing a power delta between the heater resistors of approximately 10%.

6. The method as recited in claim 1, includes providing a thermal flyheight control (TFC) with an AC signal frequency range having varying effects on the first and second heater resistors.

7. An apparatus for implementing dual partially independent flyheight control (TFC) for hard disk drives (HDDs) comprising:
   a controller;
   at least one disk; said disk including a disk medium for storing data;
   a slider including dual thermal flyheight control (TFC) includes a series connected first heater resistor and a second heater resistor; said series connected first heater resistor and second heater resistor connected between a pair of wires; one of said first heater resistor and said second heater resistor provided near a write head and another of said first heater resistor and said second heater resistor provided near a read head;
   a capacitor connected in parallel with the first heater resistor to provide a frequency dependent shunt to the first heater resistor; the second heater resistor only connected between the first heater resistor and one of said pair of wires;
   said controller applying TFC electrical bias signals to the first heater resistor and the second heater resistor via said pair of wires for providing partially independent power control and controlling minimum flypoint of said read head for reading and for controlling minimum flypoint of said write head for writing; and said applied TFC electrical bias signals having an AC bias frequency for maintaining suspension transmission path crosstalk of less than 50 dB; said applied TFC electrical bias signals having a selected frequency change of said AC bias frequency for fine TFC adjustment and an AC amplitude change said AC bias frequency for coarse TFC adjustment.

8. The apparatus as recited in claim 7 includes control code stored on a non-transitory computer readable medium, and wherein said controller uses said control code to implement dual partially independent flyheight control (TFC).

9. The apparatus as recited in claim 7 wherein said capacitor having a selected capacitance value dependent on an available AC bias frequency affecting power of the first and second heater resistors.

10. The apparatus as recited in claim 7 wherein said controller applying TFC electrical bias signals includes said controller applying high frequency electrical signals to the first heater resistor and the second heater resistor having a frequency range between 1 MHz and 100 MHz, and an amplitude of said high frequency electrical signals includes a voltage range between available power supply voltages for bias circuitry.

11. The apparatus as recited in claim 7 wherein said controller applying TFC electrical bias signals includes said controller applying a DC and high frequency electrical signal to the first heater resistor and the second heater resistor.

12. The apparatus as recited in claim 7 includes said controller providing a power delta between the heater resistors of approximately 10%.

13. The apparatus as recited in claim 7 includes said controller providing a thermal flyheight control (TFC) AC signal of less than 400 MHz.

14. The apparatus as recited in claim 7 wherein said controller applying TFC electrical bias signals includes said controller applying high frequency electrical signals including a frequency range between 1 MHz and 100 MHz having an amplitude in a voltage range between 0 and 4 Volts.

15. A system for implementing dual partially independent flyheight control (TFC) comprising:
- a hard disk drive (HDD) comprising a controller;
- at least one disk; said disk including a disk medium for storing data;
- a slider including dual thermal flyheight control (TFC) includes a series connected first heater resistor and a second heater resistor; said series connected first heater resistor and second heater resistor between a pair of wires; one of said first heater resistor and said second heater resistor provided near a write head and another of said first heater resistor and said second heater resistor provided near a read head;
- a capacitor connected in parallel with the first heater resistor to provide a frequency dependent shunt to the first heater resistor; the second heater resistor only connected between the first heater resistor and one of said pair of wires;
- said controller applying TFC electrical bias signals to the first heater resistor and the second heater resistor carried by said pair of wires for providing partially independent power control and controlling minimum flypoint of said read head for reading and for controlling minimum flypoint of said write head for writing; and said applied TFC electrical bias signals having an AC bias frequency for maintaining suspension transmission path crosstalk of less than 50 dB; and said applied TFC electrical bias signals having a selected frequency change of said AC bias frequency for fine TFC adjustment and an AC amplitude change said AC bias frequency for coarse TFC adjustment.

16. The system as recited in claim 15 includes control code stored on a non-transitory computer readable medium, and wherein said controller uses said control code to implement dual partially independent flyheight control (TFC).

17. The system as recited in claim 15 wherein said capacitor having a selected capacitance value in a range between 5 to 50 picoFarads.

18. The system as recited in claim 15 wherein said controller applying TFC electrical drive signals includes applying a selected adjusted amplitude in voltage range between available power supply voltages for bias circuitry.

19. The system as recited in claim 15 includes said controller providing a power delta between the heater resistors of approximately 10%.

20. The system as recited in claim 15 wherein said controller applying TFC electrical drive signals to the first heater resistor and the second heater resistor includes said controller applying high frequency electrical signals in a frequency range between 1 MHz and 100 MHz and an amplitude in voltage range between 0 and 7 Volts.

* * * * *